Dec. 25, 1951  H. K. MOORE  2,580,312
CONVERTIBLE AIRPLANE AND HELICOPTER
Filed Jan. 20, 1947  6 Sheets-Sheet 1

INVENTOR.
Hamilton K. Moore
BY
*A. E. Fisher*
ATTORNEY

Dec. 25, 1951  H. K. MOORE  2,580,312
CONVERTIBLE AIRPLANE AND HELICOPTER
Filed Jan. 20, 1947  6 Sheets-Sheet 3
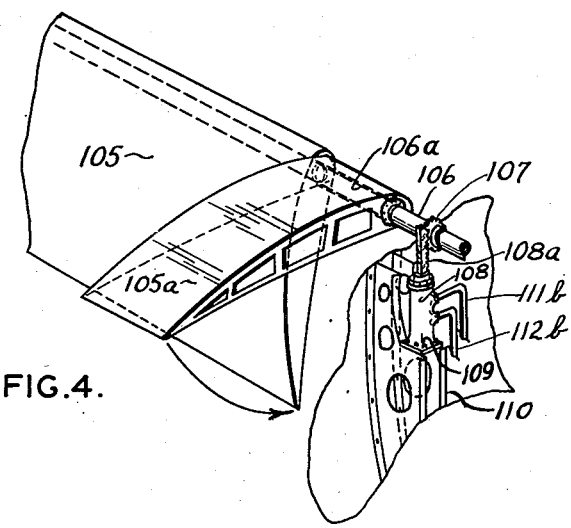
FIG.4.
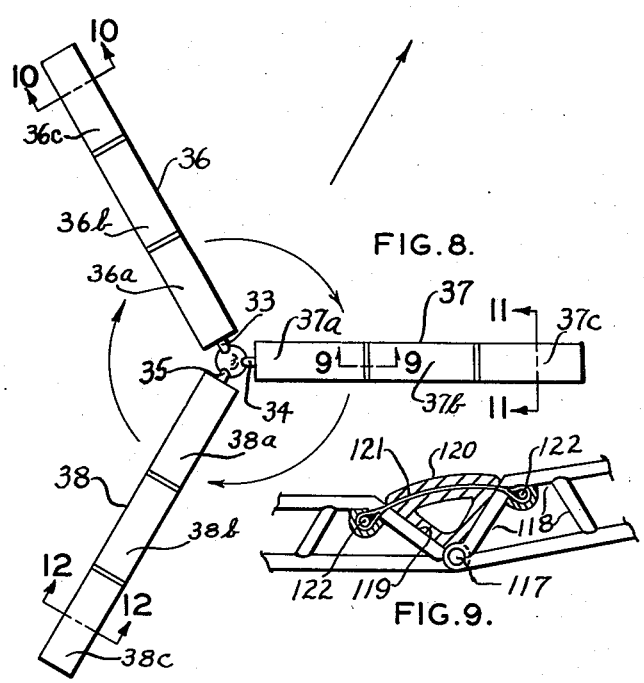
FIG.8.
FIG.9.
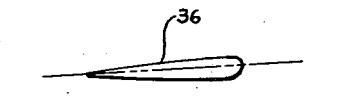
FIG.10.
FIG.11.
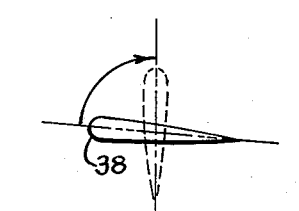
FIG.12.
INVENTOR
Hamilton K. Moore
By *U. E. Fisher*
ATTORNEY INVENTOR
Hamilton K. Moore
BY
ATTORNEY

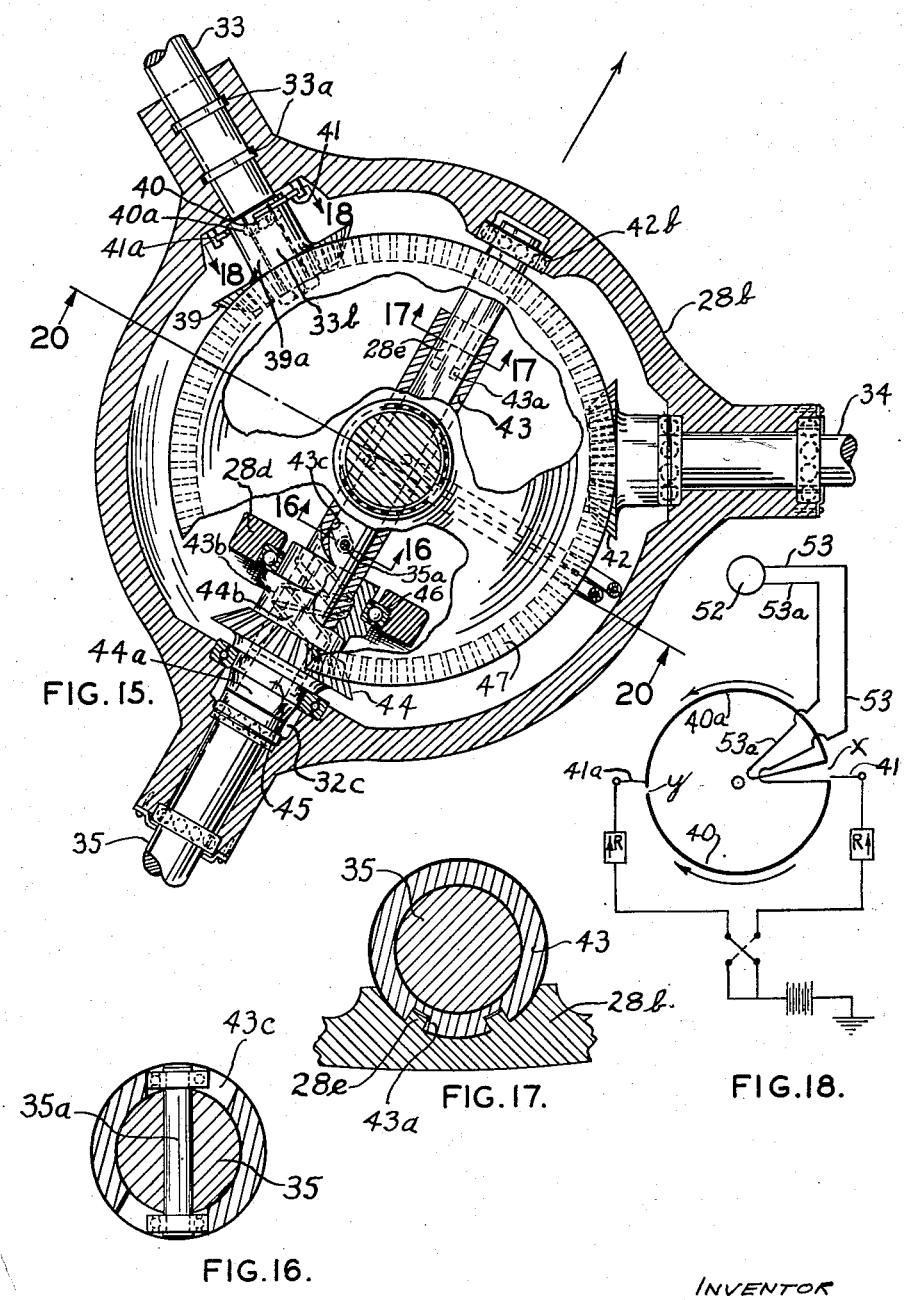

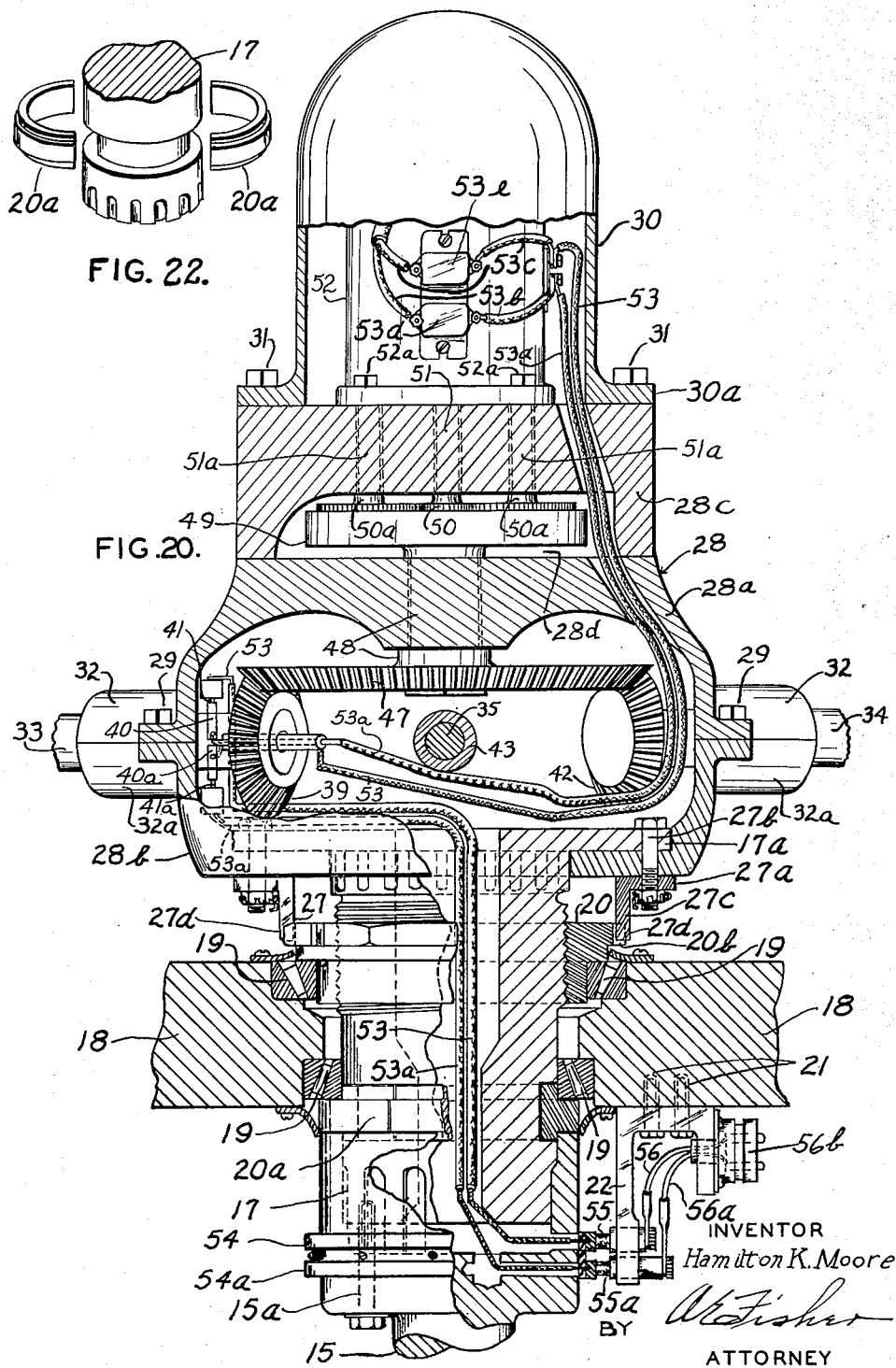

Patented Dec. 25, 1951

2,580,312

UNITED STATES PATENT OFFICE 2,580,312

CONVERTIBLE AIRPLANE AND HELICOPTER

Hamilton K. Moore, St. Louis, Mo.

Application January 20, 1947, Serial No. 723,105

6 Claims. (Cl. 244—7)

This invention relates to aircraft, and more particularly to a new design for a convertible, combination of airplane and helicopter; and the main object of the invention is to provide such convertible aircraft adapted to either ascend or descend vertically, or to travel on a straight away course.

Another object of the invention is to provide a combination airplane and helicopter, the blades of the rotor and the wings of the aircraft being mounted on spars rotatably journaled in the rotor hub and in the fuselage or frame of the craft, whereby the pitch angles of the said blades and wings may be increased or decreased, with means subject to control of the pilot for varying or changing such pitch angles at will, for meeting various exigencies of flight or travel.

Another object of the invention is to provide, in an aircraft of the kind referred to, means subject to control of the pilot for tilting the rotor of the helicopter laterally, for counteracting cross air currents, and stabilizing the air-craft in its flight.

Another object of the invention is to provide, in an aircraft of the kind referred to, an engine or motor with clutch mechanisms for engaging and operating either the airplane propeller or the helicopter rotor separately, or both simultaneously, as may be desired.

With the above stated objects in view, together with such other and additional objects and advantages as may appear from the following specification, attention is now directed to the accompanying drawings as exemplifying one preferred form and embodiment of an aircraft constructed in accordance with this invention, and wherein:

Figure 4 is a fragmentary, detail view, on a lesser scale than Figures 2 and 3, taken on the line 4—4 of Figure 1.

Figure 5 is a schematic view, in frontal elevation and on a reduced scale, showing the normal or first of three progressive steps or stages of the wings and rotor blade assembly of the aircraft, the wings of the aircraft being turned vertically downward as in a landing operation, and showing immediately above said wings and rotor the related positioning of the make and break elements of the stabilizing mechanism, all said elements being shown as normally positioned as in a landing operation.

Figure 6 is a view similar to that of Figure 5, showing the second of the three steps or stages of the said elements of Figure 5, same being the off-normal positioning of the elements on the lateral tilting of the air-craft.

Figure 7 is a view similar to the view of Figures 5 and 6, showing the third of the three steps or stages of the said elements of Figure 5 as in process of returning these elements to normal, upright position again.

Figure 1:
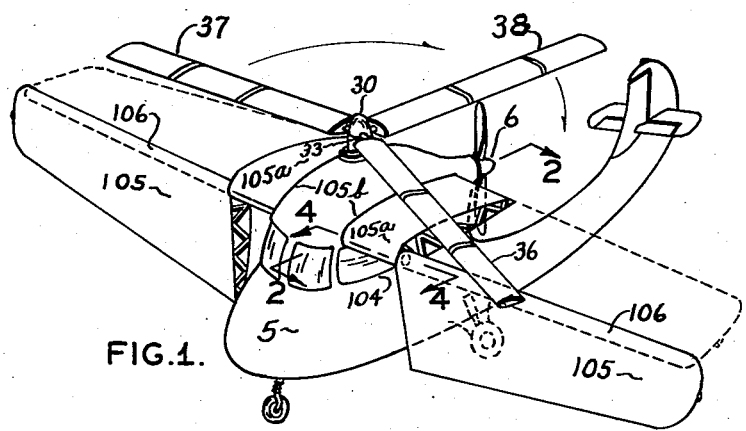
Figure 1 is a perspective view, on a relatively small scale, of a convertible, combination airplane and helicopter, constructed in accordance with this invention.

Figure 8 is a plan view, on a somewhat larger scale than Figure 1, of the rotor blade assembly, the direction of rotation of the blades and the flight of the air-craft being indicated by arrows.

Figure 9 is a fragmentary detail, on an enlarged scale relative to Figure 8, taken on line 9—9 of Figure 8, showing a cushion joint between two blade segments, the same constituting an important feature of this invention, as designed for accommodating and absorbing the bending stresses upon the blade in flight.

Figure 10 is a cross-sectional view of a rotor blade, taken on line 10—10 of Figure 8, and on an enlarged scale relative thereto.

Figure 11 is a cross-sectional view similar to Figure 10, taken on line 11 of Figure 8, showing a rotor blade as in process of rotation on its axis, the alternate positioning of the blade as turned completely over being indicated in dotted lines.

Figure 12 is a view similar to that of Figure 11, representing a rotor blade as turned vertically for serving as a stabilizing fin in straight away flight.

Figures 13, 14, 19:
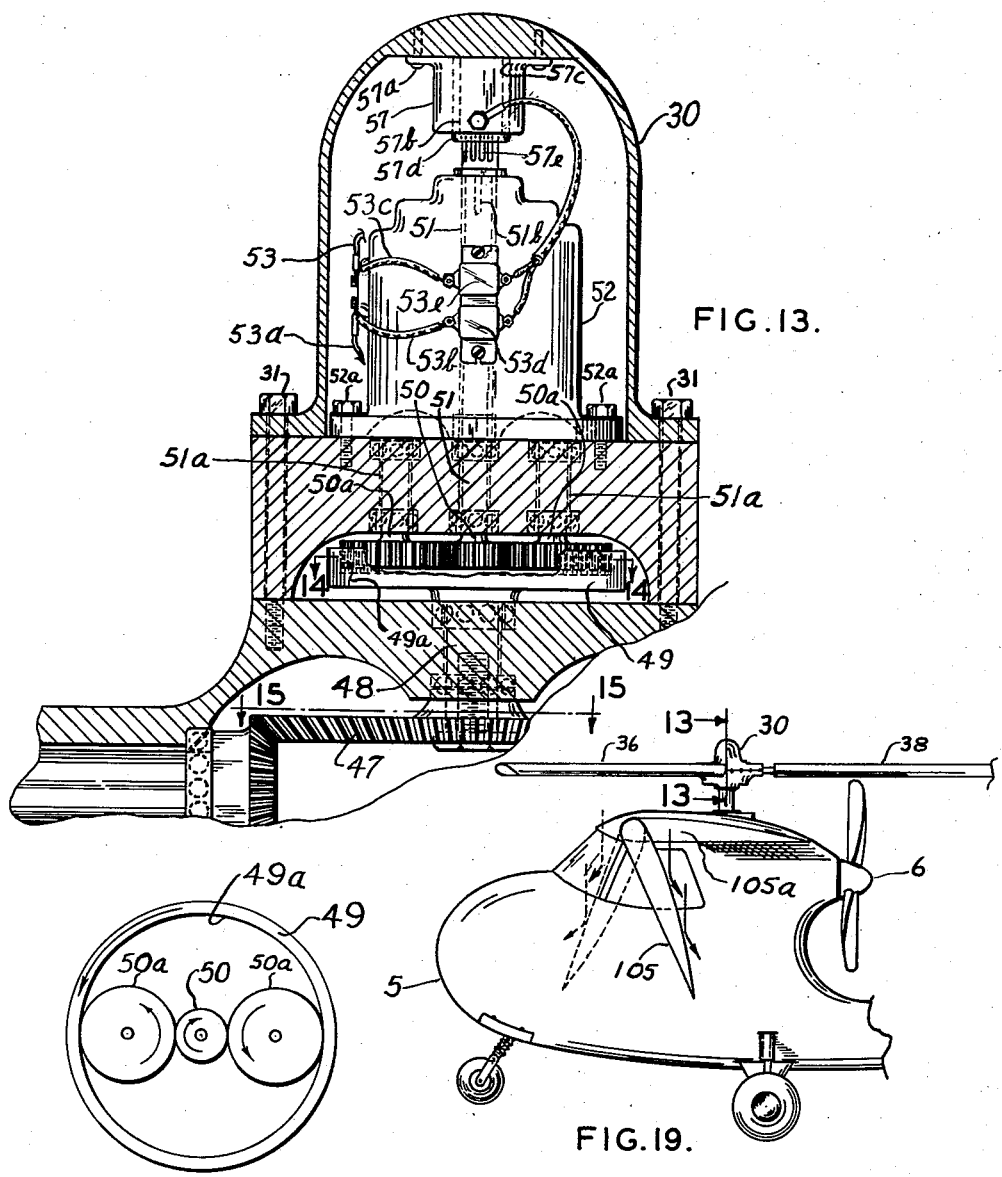

Figure 13 is a vertical section, taken on line 13—13 of Figure 19 and on a greatly enlarged scale, showing the hub of the rotor unit, the gears therein, and a fragment of rotor blade spar as extended therefrom.

Figure 14 is a schematic, detail view of the gear train assembly of the rotor hub, taken on line 14—14 of Figure 13 and on a slightly reduced scale.

Figure 15 is a horizontal section, on line 15—15 of Figure 13 and on an enlarged scale, showing the gear mechanism employed for rotating the individual rotor blades on their axes.

Figure 16 is a cross-sectional view taken on line 16—16 of Figure 15 and on an enlarged scale relative thereto.

Figure 17 is a cross-sectional view taken on line 17—17 of Figure 15 and on an enlarged scale relative thereto.

Figure 18 is a schematic sectional view, taken on the line 18—18 of Figure 15 and on an enlarged scale, showing the timing mechanism for controlling the degree of rotation of certain of the rotor blades, as indicated in Figures 11, 12, 15.

Figure 19 is a side elevation on a somewhat larger scale than Figure 1, of the forward end of the aircraft, illustrating the method of turning the craft about its vertical axis, by angularly adjusting the wings at each side, and in like manner counteracting the lateral torque generated by the rotor in flight Figure 20 is a vertical section taken on line 20—20 of Figure 15, and on approximately the same scale, through the hub of the rotor and elements contained therein, the cap of the hub being shown partly in full lines, and the hub shaft shown as extended down through the roof of the craft.

Figure 21 is a perspective view of the rotor blade assembly, as turned and set for straight horizontal flight in a direction indicated by the arrow.

Figure 22 is a detail in perspective and on a reduced scale, showing a section of the lower end of the chambered shaft-link constituting a part of the rotor shaft unit, and showing the method of assembling the associated elements.

In constructing an aircraft in accordance with this invention, I provide a suitable frame-work or fuselage of conventional materials and structure, and here generally referred to at 5, this said frame-work being covered and inclosed in usual manner.

A pusher type propeller 6 is mounted at the rear end of the craft, at the end of a propeller drive shaft 7 longitudinally journaled through the end of the craft and through a conventional type of engine or motor 8 housing as shown and mounted within the rear end of the craft. The shaft 7 is extended inwardly through the engine 8 and a beveled pinion gear 9 is rigidly keyed thereon and placed in mesh with a beveled gear 10 keyed at the lower end of a vertically disposed rotor drive shaft 11. These gears are enclosed within a separable two-part housing 12—12a bolted together at 13 and bolted at 14 to the inner end of the engine housing. The upper side of the housing 12 carries a sleeve 12b through which the rotor shaft 11 extends and whereby this shaft is supported in its operative vertical position.

Figure 2:
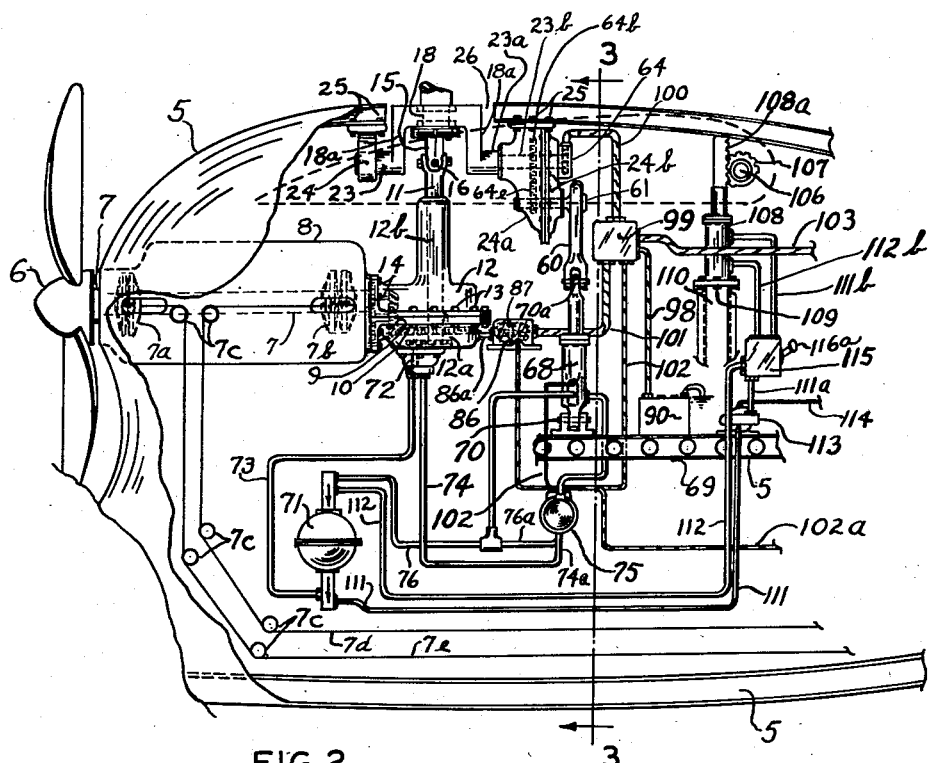
Figure 2 is a fragmentary view, on an enlarged scale and partly in section, of the main or body portion of the aircraft, same being a longitudinal, vertical section, taken on the line 2—2 of Figure 1.

A stub-shaft link 15 is extended at the upper end of the rotor shaft 11, and is connected therewith by means of a universal joint 16 (Figure 2). The shaft link 15 is flanged and splined circumferentially at its upper end and thereby bolted as at 15a to the complementally splined or grooved lower end of another, but chambered stub-shaft link 17, which is journaled through a crank block 18 on vertically spaced roller bearings 19 (Figure 20), which are held in place in the block by the lock-rings 20, 20a. The upper ring 20 is threadedly seated as shown (Figure 20) on the upper end of the shaft link 17, for facilitating the assembling of the elements. The lower ring 20a is parted for facilitating mounting on the lower grooved end of the link 17. (Figure 22.) Bolts 21 support at one side a bracket 22 designed for carrying electrical connectors in manner later explained. The crank block 18 is the crossmember connecting the arms 18a (Figure 2) of a crank, and the free ends of these arms are formed with longitudinally extended and aligned journal shafts 23, 23a (Figure 2) which are journaled in hangers 24, 24a depended from the roof of the craft and bolted thereto as at 25.

The crank block 18 is located freely in a transversely elongated opening 26 formed medially through the roof of the craft, and is thus adapted to oscillate laterally in said opening, carrying with it said shaft-link 17 and connections. The recessed and chambered shaft-link 17 is flanged outwardly circumferentially at its upper end, as at 17a, and is also splined as shown, and is thus adapted to seat downwardly through the circularly apertured and complementally grooved or splined lower end of the hollow, two-part, rotor blade hub 28, the upper and lower parts 28a, 28b, thereof being bolted together as at 29 to complete the hub, and which hub also forms a primary rotor blade gear housing.

The outwardly flanged upper margin of the upper lock ring 20 is diametrically notched as at 20b. A pair of right-angled lock-lugs 27 is provided (Figure 20), the upwardly positioned and outwardly turned webs or flanges 27a thereof being apertured for passing the bolts 27b, whereby by passing these bolts likewise through the out-turned flange 17a of the shaft-link 17, and through the bottom or lower end of the lower hub part 28b, these elements are all firmly but removably locked together. The downturned webs or flanges 27c of the angular lugs 27 are fitted into the notches 20b of the lock ring 20, and so as to intermesh therewith when the elements are assembled. With the elements thus firmly bolted together, the locking ring 20 cannot turn, and a very rigid joint is provided. By removing the bolts 27b the elements may be disassembled, and the lock-ring 20 may be rotated on its threads for adjusting the bearings 19.

A secondary rotor blade gear housing 28c is seated upon the upper housing 28a, and upon that is seated a motor dome or housing 30, flanged circumferentially at its lower end as at 30a and these elements are then secured together by bolts 31 passed down through the flange of the dome 30, through the secondary housing 28c and threadedly seated in the hub and housing part 28a. The parts 28a, 28b of the hub housing are formed with laterally extended, angularly equi-spaced and aligned, rotor blade sleeve-parts 32, 32a, semi-circular in cross-section, for providing sleeves or bearings and journal boxes for rotatably engaging the inner ends, shanks or journals of the rotor blade spars 33, 34, 35, which carry the rotor blades 36, 37, 38, forming the helicopter unit of the craft, (Figures 15, 20).

As here shown by the arrows, the helicopter blades are represented as revolving in clockwise direction, as regarded from above. Inasmuch as one important object of the invention is to adapt the helicopter, not only for normal vertical movement of the aircraft, but also for straight away flight after the desired altitude is attained, provision is made accordingly for adjusting the rotor blades for such straight away flying, and as will now be described. One of the rotor blades, as the blade 36 as here shown, is set at a fixed and permanent pitch by fixedly anchoring the shank or journal of its spar 33 within its bearing sleeve, as indicated at 33a (Figure 15)

A reduced spindle 33b is axially extended at the inner end of the spar 33, to form a journal on which is rotatably seated a beveled timing gear 39. The hub 39a of this gear carries the insulated commutator elements 40, 40a, arranged and adapted to engage electrical contact brushes 41, 41a, as extended in the hub housing for that purpose, and whereby the electrical current operating the control motor, as later explained, may be alternated or reversed, for the purpose of partially rotating and setting the other and electrically controlled rotor blades 37, 38, to the exact degree required in the operation of the craft in straight away flight, and as later explained.

A similar beveled gear 42 is rigidly keyed upon the inner end of the rotor blade spar 34, for partially rotating or half-turning the rotor blade 37 as required in straight away flight. The inner end of the blade spar 35 is extended diametrically through the hub 28 and is journaled in the bearing 42b formed in the hub wall. (Figures 15 and 20.) A sleeve 43 is mounted freely upon this inner end of the spar 35, and is cut shorter than the inner diameter of the hub so that it may slide or oscillate longitudinally on the spar 35. The outer end of the sleeve 43 is slotted longitudinally as at 43a (Figures 15, 17) for slidably engaging lugs 28e formed up on the base 28b of the hub 28. Thus this sleeve may reciprocate on the spar 35, but cannot rotate. At the opposite side of the hub 28, the inner mouth of the journal box formed by the sleeve parts 32, 32a, is widened, as at 32c, and the sleeve 43 thereat is formed with a worm groove as indicated at 43b. A beveled gear 44 on its hub 44a, is rotatably seated over this grooved end of the sleeve, the outer end of said hub being journaled in the bearing 45 seated in the mouth of the journal box, and the inner end being journaled in the bearing 46 seated in a pedestal extended up from the hub base 28b, this pedestal being chambered out for the purpose and apertured centrally for passing the sleeve 43 and inclosed spar 35. A worm or screw 44b is formed within the hub 44a on the inner faces thereof, said worm being formed complemental to and adapted to seat and turn freely within the worm-groove 43b of the sleeve 43. Inwardly of the hub and of the pedestal 28d the sleeve 43 is formed with a pair of diametrically opposed and angularly extended torque slots 43c, the angle or pitch thereof corresponding with the directional turn or twist of the said worm and groove. A torque pin 35a is fixedly seated through the inner end or shank of the spar 35, in operative alignment with the torque slots 43c, the ends of this pin being protruded into said slots, whereby on the reciprocation of the sleeve 43 on the spar 35 the latter will be caused to partially turn or rotate, the degree of rotation depending on the length of the commutator contacts 40, 40a, on the hub 39a of the timing gear 39 as carried on the inner end of the spar 33. The proper degree of rotation will be later pointed out.

The partial rotation of the beveled spar gears 39, 42, 44, is accomplished by means of a beveled master gear 47 keyed at the lower end of the stub-shaft 48 (Figures 13, 18, 20), the latter being journaled centrally through the upper hub and housing part 28a. A driven planetary gear 49 is keyed upon the upper end of this shaft and lies within a recess 28d formed in the lower side of the housing section 28c. This gear is dished and the annular raised margin thereof is gear-cut to form the internal spur gear teeth 49a. (Figures 13, 14.) The gear 49 is thus adapted to operatively engage the inclosed planetary gear unit comprising the central drive pinion 50 as intermeshed with a pair of laterally disposed idler gears 50a which in turn mesh with the gear 49. The pinion 50 is keyed upon the lower end of the motor shaft 51 of the reversible electric motor 52 bolted at 52a in the dome 30 of the assembly, said shaft being extended down and journaled through the upper side of the housing 28c. Likewise the idler gears 50a are keyed upon the lower ends of the stub-shafts 51a journaled through the upper side of the housing 28c. The motor 52 is energized through the lead-in wires 53, 53, for clockwise and counter-clockwise rotation of the motor shaft 51, gears 49, 47, the connected blade spars 34, 35 and the rotor blades 37, 38 as carried thereon. The wires 53, 53a are extended down through the assembled elements as clearly shown in Figure 20, and they end in insulated contact rings 54, 54a mounted around the lower end of the stub shaft-link 17, said rings being thus adapted for engaging the brushes 55, 55a, supported on the bracket 22, and connected with the ends of the outer wires 56, 56a, which are extended through the connector 56b to and end in switches on the instrument board of the pilot's cockpit, in conventional manner, and not here shown. The wires 53, 53a may be grounded to the frame of the craft in conventional manner.

A solenoid unit 57 (Figures 13, 20) is bolted as as 57a, through the upper flanged end of its housing, centrally within the top of the dome 30. This unit conventionally includes an inner cylindrical shell 57b mounted concentrically within the outer cylindrical housing, an insulated helical winding within the space between the inner shell and outer housing, a central core or plunger of iron freely positioned within the inner shell for axial reciprocation, and means for electrically energizing the helical winding. In accordance with this invention, the inner shell 57b (Figure 13) is grooved longitudinally as at 57c, and thus arranged to slidably engage the complementally splined plunger or core 57d formed with the downwardly protruded clutch fingers 57e, and the plunger is spring-set for normally urging the clutch fingers outwardly and downwardly. However, as the solenoid is electrically energized the core or plunger is drawn upward, thus retracting the clutch fingers. The motor shaft 51 is complementally bored out and longitudinally grooved through its upper end, as indicated at 51b (Figure 13) for slidably engaging the lower end of the splined core 57d and the fingers 57e. The solenoid unit 57 is energized through shunt wires 53b, 53c, extended from the wires 53, 53a (Figure 20) and through the directional relays 53d, 53e. By this conventional arrangement, when the solenoid is not energized, the fingers 57e will be spring-pressed downward and intermesh with the bored and grooved upper end 51b of the motor shaft 51, thus locking that shaft against rotation and simultaneously locking the connected rotor blade spars 34, 35, and blades 37, 38, at any degree or angle of pitch at which they are turned, at the instant the core 57d falls. On the other hand, when the solenoid and motor are simultaneously energized by the pilot turning one of the switches on the instrument board, the plunger 57d and fingers 57e are drawn free of the motor shaft 51, and the motor 52 simultaneously rotates this shaft to reset the rotor blades to a new angle or pitch, as desired or as may be automatically determined in manner now to be described.

For vertical ascent, the helicopter blades are all set at the usual pitch for the purpose, the blade 36 being permanently so set, and the blades 37, 38, being correspondingly so set through operation of the motor 52 and the commutator elements 40, 40a, as above stated. For straight away flight however, and in order that the helicopter blades may be stationarily and properly positioned or turned for co-operating with the wings of the craft, as later referred to, it is necessary that all the blades 36, 37, 38, cease to rotate, that two of the blades, as 36 and 37, be aligned transversely of the craft, that the blade 37 be turned completely over through the required angle, for aligning its pitch and leading edge with the pitch and leading edge of the fixed blade 36, and that the third blade 38 be directed rearwardly and turned or feathered vertically through the required angle, so as to serve as a stabilizing fin or rudder in flight. For automatically accomplishing such turning of the blades 37, 38, the commutator contacts 40, 40a on opposite sides of the gear hub 39a are of the exact length required for rotating the blade 37 the proper degree as above specified, and the worm or screw 44b within the hub 44a, as riding within the complemental groove 43b of the sleeve 43, is of such length and pitch as to cause the torque pin 35a as passed through the spar 35, to traverse the angular torque slots 43c of the sleeve 43, the exact distance required for rotation the blade spar 35 and blade 38 to feather vertically as above specified. These movements are accomplished by the pilot closing the one of the stated two switches on the instrument board and thus energizing the motor 52 for operating the solenoid and control gears as above pointed out.

The commutator strips or contacts 40, 40a, and brushes 41, 41a, are mounted at opposite sides of the gear hub 39a, and are thus adapted for passing the electric current in either direction through the connected motor 52, (the engine 8 and rotor shaft 11 being first disconnected) for rotating the motor shaft 51 in either direction and thus either turning the blades 37, 38, (Figures 8, 10, 11, 12) into fixed and stationary positions for straight away flight, or else returning them again to their revolving or rotary status for vertical ascent. Owing to the normal pitch of the rotor blades for vertical climbing, spaces $x$, $y$, (Figure 18) are left which circumferentially separate the commutator strips 40, 40a. Consequently the corresponding arrangement of the brushes 41, 41a, is such that as one of the brushes, as for example the brush 41, passes into the space $x$, thus breaking the circuit as flowing in one direction or stopping the motor 52, the opposite brush 41a will be left standing at the end of the reversing commutator strip 40a at the space $y$, whereby as the motor is reversed by the pilot closing the other switch, the blades 37, 38, will be automatically shifted to their alternate positions, for vertical ascent or straight away flight, as the case might be, in manner already pointed out. In this connection it is to be noted that when the rotor blades are turned and set for straight away flight, with the engine and rotor shaft disconnected, the air stream will catch and turn the rudder blade 38 rearwardly, where it belongs, owing to its greater vertical area presented to the wind. Additionally, any conventional means (not here shown) may be employed for holding these blades steadily to position for horizontal flight. The positioning of the helicopter blades relative to the wings of the aircraft, for straight horizontal flight, is shown in Figure 21.

In the operation of an aircraft of the kind described, wind currents will frequently tilt the craft laterally, making it necessary to right the craft again, and in accordance with my invention, this is accomplished by manipulation of the helicopter unit and blades in the following manner: As above pointed out, the rotor drive shaft sections 11, 15, are connected through the universal joint 16 and with the connected shaft link 17 journaled through the crank block 18, thus enabling the rotor to be oscillated laterally. The mechanism for this purpose comprises a walking beam 60 (Figures 2, 3) on its shaft 61, and mounted in the upper medial portion of the craft, said shaft being journaled at one end through the lower end of the forward hanger 24a. The hanger 24a is in the nature of a two-part hollow casing bolted together as at 24b and depended from the roof of the craft by means of bolt 25. The journal-shaft 23a, as extended forwardly from the crank leg 18a is reduced and journaled through the upper end of the casing hanger 24a, as indicated at 23b, vertically above and in parallel alignment with the walking beam shaft 61. Vertically aligned and intermeshed gear segments 64b, 64e, are keyed upon these shafts inside the casing 24a. A circuit make and break unit 64 (Figures 2, 3) is mounted at the face of the casing hanger 24a, immediately over the walking beam 60. This unit includes an insulated make and break cam 64a, pinned at 64c to the exposed forward end of the shaft 23b, and so as to oscillate therewith under the lateral tilting of the helicopter rotor relative to the aircraft as a whole. Immediately over the cam 64a is mounted a semicircular metallic contact bracket 64d which is fixedly secured to the face of the casing hanger 24a, but is insulated therefrom in conventional manner. As above stated, the rack segment 64b meshes with its complementary rack segment 64e rigidly mounted on the shaft 61 of the walking beam 60. Electrical contacts 65, 65a, are removably supported on flexible fingers 65b, from which they are insulated, at either side of the cam 64a and freely within the lateral spaces intervening between that cam and the adjacent metallic ends of the bracket 64d. Thus as the cam 64a oscillates laterally to either side, it impinges the intervening contact 65 or 65a and forces same over against the downturned end of the bracket 64d, for closing an electrical circuit from the supply line 66 as connected at 66a with the said bracket, through either of the lines 67, 67a, as connected to and extended from the movable contacts 65, 65a, for operating the solenoid master valve and for other purposes as later explained.

Figure 3:
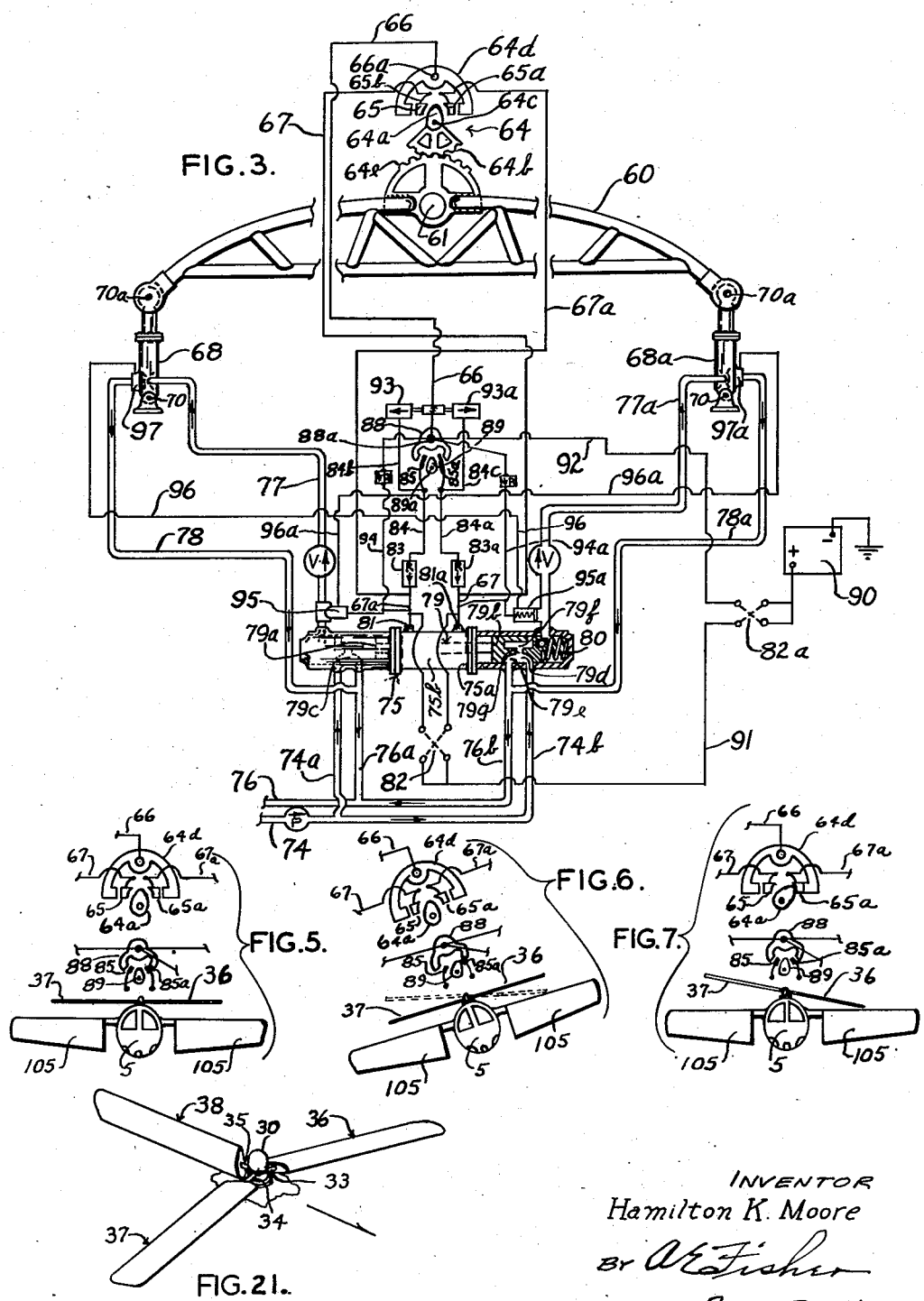
Figure 3 is a combined cross-sectional and schematic view, taken on the line 3—3 of Figure 2 and on the same scale therewith.

A pair of hydraulic jacks 68, 68a, is mounted vertically below the ends of the walking beam 60 at either side of the craft, said jacks being supported on rails 69 (Figure 2) extended from the frame 5 of the craft. The lower ends of the jack cylinders are pivoted as at 70 to the rails 69, while the upper ends of the piston rods are similarly pivoted as at 70a to the ends of the walking beam 60. The hydraulic fluid for operating these jacks is contained in a conventional vessel 71 at each side, and a pump 72 is mounted on the lower side of the housing 12 and its casing opens thereinto for connection with and operation by the gear 10 in a conventional manner. By means of this pump the hydraulic fluid is drawn from the vessel 71 through the connecting pipe 73, and this fluid is then forced out again under pressure by the pump, through the pressure pipe or line 74, from which main pipe branch pipes 74a, 74b, are connected with the outer ends of the master control cylinder or valve cylinder 75, which is mounted transversely in the frame of the craft (Figure 3). Return branch pipes 76a, 76b, are connected with the under side of the cylinder 75 inwardly of the pipes 74a, 74b, and in alignment therewith, and these pipes 76a, 76b, in turn are connected with the main return pipe 76 leading back to the vessel or container 71. Jack operating pressure pipes 77, 77a, are connected at one end with the outer ends of the cylinder 75 at the upper side thereof, outwardly of the inlet pipes 74a, 74b, and at their opposite ends these pipes are operatively connected with the jacks 68, 68a, and from these jacks return pipes 78, 78a, extend back to and connect with return branch pipes 76a, 76b, leading from the cylinder 75. The cylinder 75 is of three flanged sections as shown (Figure 3), and bolted together through their flanges, as at 75a. Within the cylinder 75 is reciprocatingly mounted a two-headed solenoid piston valve unit 79, the same being so dimensioned that the elongated heads 79a, 79b, thereof overlie at each end the mouths of the inlet and outlet pipes 74a, 74b, and 76a, 76b, but do not cover the mouths of the upper pressure outlet pipes 77, 77a, when the piston unit 79 is in its medial or inoperative position within the cylinder 75. The central section 75b of the cylinder 75 is wound to form a solenoid, wherein the connecting rod 79c of the heads 79a, 79b, serves as a plunger.

The valve piston heads 79a, 79b, are formed interiorly with the flow-ports 79c, 79d, which as shown in Figure 3, include the lower forks 79e adapted for connecting the inner mouths of the pipes 74a, 76a, and 74b, 76b, when the piston unit 79 is in medial position, the upper forks 79f, and the connecting stems 79g. The arrangement of these ports is such that with the piston unit 79 positioned medially in the piston 75 (Figure 3), the flow of hydraulic fluid would be shut off from the pipes 77, 77a, leading to the jacks 68, 68a, but would be returned through the pipes 76a, 76b, without interferring with the circulation of the fluid through other and connected parts of the system. On the other hand, when it is desired to operate either of the jacks 68, 68a, for tilting the rotor unit or blades laterally, this is done by sliding the piston unit 79 towards either end of the cylinder 75, as desired, far enough to close one of the inlet pipes 74a, 74b, while by the same movement connecting the other inlet with either of the jack operating pipes 77, 77a, through the aligned forks of either one of the ports 79c, 79d. Coil springs 80 are mounted in the ends of the cylinder for normally holding the piston unit 79 to its medial, inoperative position within the cylinder 75.

The central solenoid section 75b of the cylinder 75 is electrically energized for moving the piston valve unit 79 to either end of the cylinder 75 for the purpose of actuating either of the jacks 68, 68a, through the electrical connections 81, 81a, inserted through the ends of the solenoid section 75b of the valve cylinder 75, said connection being incorporated in circuit with the wiring 67, 67a, and said wiring including shunt extensions to the reversible switches 82, 82a, mounted on the instrument board of the craft, the relays 83, 83a, and connected wiring 84, 84a running to the movable insulated contacts 85, 85a.

The switch 82 controls the flow of current through the wires as stated, for the automatic operation of the electrical system and connected devices, for the purposes described. The other switch 82a is hand operated, and provides means for operating the electrical system and connected devices should the automatic system fail for any reason.

A gyroscope box 86 is mounted on a bracket 86a extended from the housing 12, and within this box is mounted a conventional gyroscope 87. An insulated, semi-circular, metallic contact bracket 88 is fixedly pinned at 88a within the box, and an insulated make and break cam 89 is mounted on a spindle 89a, between the said movable contacts 85, 85a, the latter being also mounted within the box 86, between the cam 89 and the pendant legs of the contact bracket 88 at each side. The spindle 89a of the cam 89 is journaled in the box 86 and is so associated and connected with the gyroscope 87, that so long as the aircraft in flight maintains its normal upright position, the cam 89 will remain equally poised between and air-insulated from the contacts 85, 85a, but immediately on the lateral tilting of the aircraft towards either side, then the cam 89 will push one of the contacts 85, 85a, over against the adjacent leg of the contact bracket 88, thus closing an electrical circuit through the connected wiring. The electrical system employed further includes a battery 90 mounted on and grounded to a rail 69 of the frame and controlled by the reversible switch 82a, the main line wires 91, 92, with line 91 connecting through the switch 82 with the wires 67, 67a, the latter being joined to the connections 81, 81a, of the solenoid sections 75b of the valve cylinder 75, for operating the valve piston heads in manner described, the one-way relays 83, 83a, and wiring 84, 84a, running to the conventional movable contacts 85, 85a, the extensions 84b, 84c, from wires 84, 84a, running to the ends of a two-way solenoid switch 93, 93a, and with line 92 connecting through the switch 82a and contact pin 88a with the wires 94, 94a, for operating the pressure switches 95, 95a, for controlling the flow of the hydraulic fluid into the jack operating pipes 77, 77a, the wires 96, 96a extended from the valves 95a, 95, to the magnetic relief valves 97, 97a, of the jacks 68, 68a, for releasing the fluid from either jack through the pipes 78, 78a, as the opposite jack is operated, the arrangement being such that the valves 95, 97a, are simultaneously operated, and alternately the valves 95a, 97, are likewise simultaneously operated. Thus the walking beam 60 and connected rotor of the helicopter may readily be rocked laterally to either side by manipulation of the said switches and electrically controlled valves. The various sets of wiring as above described and as shown schematically in Figure 3, are formed into cables as shown in Figure 2, and thus extended to position said cables including cable 98 from the battery 90 to the master circuit box or distributor box 99 supported within the craft in any conventional manner, and from which box are extended cables 100 to the make and break unit 67, the wires 101, 102, to the gyroscope box 86, with branches, to the switches 95, 95a, and 97, 97a, and extensions 102a, and 103 to the controls (not shown) in the pilot's cab 104.

In the operation of the jacks 68, 68a, for righting the craft, the solenoid switches 93, 93a, operate to cut out the circuit from the supply wire 66 so long as the craft is tilted to either side, but as the craft is righted horizontally, the gyroscope 87 pulls the cam 89 free from either contact 85, 85a, and closes the current through the wire 66 for operating the make and break unit 64, in manner pointed out, for again righting and leveling the blades of the helicopter. Figures 5, 6, 7 illustrate the positioning of the craft, rotor, and the make and break units, in the righting of the craft from a lateral tilted position.

Wing panels 105 are provided and mounted on tubular spars 106, and the inner ends of these spars are journaled through the fixed and stationary shoulder sections 105a of the wings, as at 105a (Figure 4), said sections being rigidly anchored at the right pitch to the frame and fuselage of the craft, as indicated at 105b in Figure 1. The inner ends of the spars 106 are passed into the upper forward portion of the pilot's cab 104, at each side, and spur gears 107 (Figure 2) are rigidly keyed upon these inner ends. Hydraulic jacks 108 are bolted as at 109 on brackets 110, directly under the gears 107, and the upper ends of the piston rods of the jacks 108 are formed as racks 108a and placed in mesh with the gears 107. The brackets 110 are supported on extensions (not shown) from the frame 5 of the craft. An alternate means of support would be strap hangers from the roof of the craft. Either method would be conventional structure.

Hydraulic supply and return pipes 111, 112, are extended at each side of the craft from the lower and upper sides of the hydraulic fluid containers 11, and at their forward ends these pipes are turned upwardly towards the jacks 108. The supply pipes 111 enter electric pumps 113 mounted on the rails 69 (Figure 2), the control lines 114 thereof being extended to switches on the instrument board in the pilot's cab. The delivery sides of the pumps 113 are connected by short pipes 111a with selector valve boxes 115, at the under sides thereof, and other short pipes 111b connect with these boxes through their upper sides, the upper ends of said pipes being in turn connected with the upper ends of the jacks 108. Similarly the return pipes 112 connect with the boxes 115 through the sides thereof as shown, with short connecting pipes 112b connecting these boxes with the lower ends of the jacks 108. Conventional forms of valves are mounted in the boxes 115, with extended handles 115a, whereby the flow of the hydraulic fluid through the said supply pipes and through the jacks 108 may be controlled, these operations in turn serving to turn the wings 105 as desired, for increasing or decreasing the pitch thereof as necessary in the operation of the aircraft.

Inasmuch as this combination aircraft is designed to serve both as a helicopter for vertical movement and for straight away flying as an airplane, and since helicopter rotor blades are conventionally made lighter and more flexible, and consequently less rigid than the conventional wings of an airplane, I here describe and show (Figures 8, 9) a form of rotor blade adapted to function equally well as a flexible blade for the rotor of a helicopter in its vertical movements and also as a relatively stiff and rigid, auxiliary airplane wing for straight away flight, when turned to proper position for that purpose as above described, and so locked. Owing to the forward thrust of an airplane in straight away flight, stronger upward stresses are brought to bear on the under sides of the wings thereof than on the blades of a helicopter rotor as normally operated for vertical ascent only, or at any rate the lifting stresses on the wings are more effective, because centrifugal force as exerted on the rotor blades in ascent tends to hold them stretched out straightly.

Accordingly and to meet such dual purpose and function of such rotor blades as required in the present invention, I provide sectional helicopter blades such as here represented at 36, 37, 38, in Figures 8, 9. As shown, these blades are constructed in sections 36a, b, c, 37a, b, c, and 38a, b, c, the sections being pivotally connected transversely by pins 117 journaled through overlapped portions of the bracing or struts 118 of the blades, at the under sides thereof. At the upper sides of the blades, vertical V-shaped partings 119 are formed in the strut formations, wherein are mounted complementally shaped hollow or tubular and flexible cushions 120 of rubber or other suitable material. Arcuate tie rods 121 are anchored at their ends to bolts or pins 122 mounted in the strut formations on the margins of the partings 119, and these rods 122 serve to prevent the blade sections from sagging below their normal level positions. But when as stated, these blades are set in their stationary positions for functioning as auxiliary wings, the said lifting stresses imparted to them by straight away flight, will be taken care of by the flexing of the blades at the cushions 120.

It is thought that from the foregoing disclosures as embodied in the drawings and specifications, the construction, use and operation of the described combination airplane and helicopter will be fully understood, and while certain specific embodiments and structural features are thus disclosed and described, it is to be understood that the same may be changed and modified as desired to best effectuate a practicable combination aircraft of the kind referred to, provided that such changes and modifications fall within the scope of the appended claims.

I claim:

1. In a combined airplane and helicopter adapted for vertical ascending and descending movements and straight-line travel at will, a helicopter assembly permanently mounted at the top of the airplane body, a power source for the helicopter assembly, the helicopter assembly including a housing, a vertical rotor shaft journaled in the housing and extending thereabove, three rotor blades radially extending from the upper end of the rotor shaft and uniformly spaced about a center located on the longitudinal axis of the rotor shaft, one of said rotor blades being mounted with a permanent fixed pitch, the remaining pair of rotor blades being mounted for individual and controlled adjustment as to pitch, blade pitch adjusting means for placing the adjustable pitch blades in the same pitch as the fixed pitch blade relative to the plane of rotation about the rotor shaft for rendering the helicopter assembly rotatably operable for vertical movement of the airplane, said means including means to rotate one of said adjustable pitch blades to present its transverse axis vertically to function as a rudder whereby when the rotor shaft is disconnected from the power source, the rotor blades will be disposed symmetrical to a vertical plane through the longitudinal axis of the airplane, with the blade of permanent fixed pitch and one of the blades of variable pitch respectively extending in opposite directions substantially transversely of the longitudinal axis of the airplane, and the other blade of variable pitch being in a trailing position with respect to the line of flight, 2. A combined airplane and helicopter as set forth in claim 1, wherein one of said pair of rotor blades is mounted for arcuate adjustment about its axis through an angle of approximately 180° to thereby enable blade travel about the longitudinal axis of the rotor shaft with its leading edge positioned incident to the travel path of the blades during vertical movements of the airplane and to reverse the position of such leading edge to present said blade in the same pitch relation as the permanent pitch blade during straight-away flying.

3. A combined airplane and helicopter as set forth in claim 1, wherein the mounting of each of the blades includes a spar section extending along the longitudinal axis of the radiating blade and extending within the peripheral wall of the housing, and means in the pilot station of the airplane for actuating said blade pitch adjusting means.

4. A combined airplane and helicopter as set forth in claim 1, wherein the helicopter assembly includes a spar for each of the rotor blades, the spars being supported in the housing, said blade pitch adjusting means including pinions mounted on the spars of the adjustable pitch blades and a master gear engaging said pinions.

5. A combined airplane and helicopter as set forth in claim 4, wherein the blade pitch adjusting means includes a motor-driven assembly operative to drive the master gear in either direction of rotation and controllable at will from the pilot station, a time-control instrumentality of the commutator type operative to control the time-length of the operation and a pinion mounted on the spar of said blade of fixed pitch engaging said master gear, said instrumentality being mounted on the last-named pinion.

6. A combined airplane and helicopter as set forth in claim 5, wherein said blade pitch adjusting means includes means for imparting differential angular displacements to the spars of said adjustable pitch blades.

HAMILTON K. MOORE.

REFERENCES CITED

The following references are of record in the file of this patent:

UNITED STATES PATENTS

| Number | Name | Date |
|---|---|---|
| 1,812,968 | Luzardo | July 7, 1931 |
| 2,074,342 | Platt | Mar. 23, 1937 |
| 2,108,417 | Stanley | Feb. 15, 1938 |
| 2,137,952 | Rothenhoefer | Nov. 22, 1938 |
| 2,385,464 | Peterson | Sept. 25, 1945 |

FOREIGN PATENTS

| Number | Country | Date |
|---|---|---|
| 580,887 | France | Sept. 13, 1924 |
| 438,111 | Great Britain | Nov. 12, 1935 |